March 26, 1935.  H. B. BUXTON  1,995,340
CABLE GUIDE BRACKET
Filed May 29, 1931
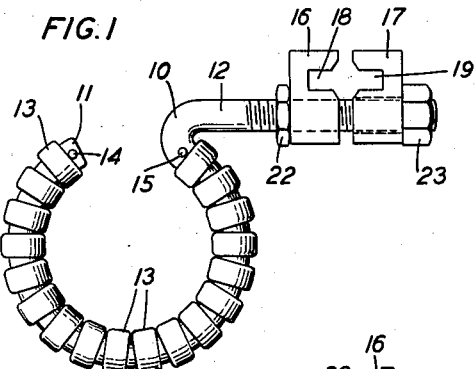
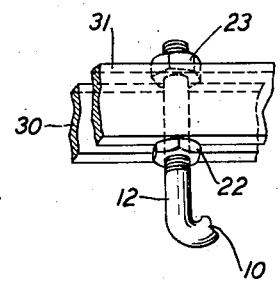
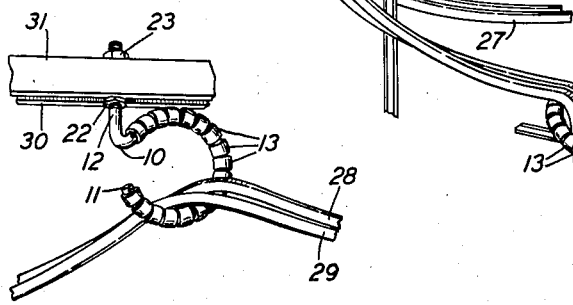
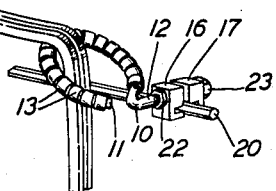
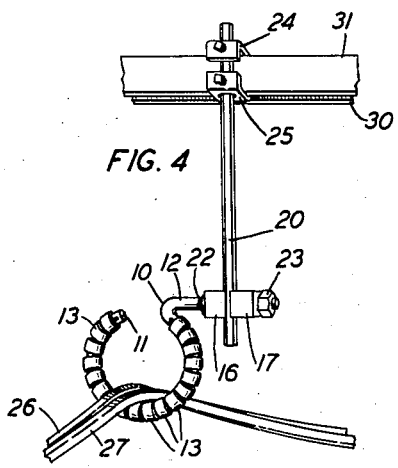
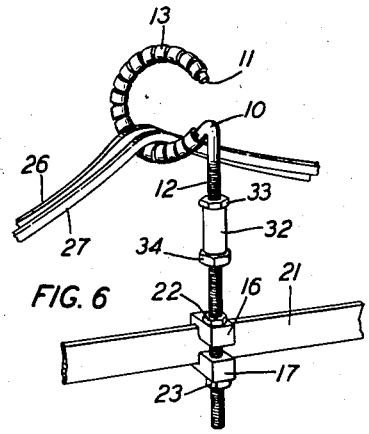
INVENTOR
H. E. BUXTON
BY J. Mac Donald
ATTORNEY Patented Mar. 26, 1935

1,995,340

UNITED STATES PATENT OFFICE 1,995,340

CABLE GUIDE BRACKET

Hugh B. Buxton, Roselle, N. J., assignor to Western Electric Company, Incorporated, New York, N. Y., a corporation of New York Application May 29, 1931, Serial No. 540,824

2 Claims. (Cl. 175—376)

This invention relates to an improvement in cable guides and more particularly to a cable guide bracket for use in the installation of telephone cables.

The object of the present invention is to provide a simple and unitary means for the guidance of telephone cables, while they are being installed on cable racks and the like.

A further object of my invention is to provide a means for guiding cables and the like which will not only be strong and durable, but will also adapt itself readily to different supporting means.

A still further object of my invention is to provide a strong and durable guide bracket which is cheap to manufacture and which may be supported in numerous ways to meet the varying conditions encountered in the installation of telephone cables, particularly in central offices.

In accordance with my invention I provide a cable guide bracket which consists of an open hook portion and a shank portion extending therefrom, said extending portion being arranged to be secured to various supporting means by means of adjustable clamps. Located on the hook shaped portion of the clamp are a series of collars which are arranged in close proximity with each other, and loosely mounted thereon so as to act as rollers. It can be readily observed that when this cable guide bracket is placed in position and the telephone cables are pulled through it a minimum amount of energy is required and due to the rollers on the bracket no damage is done to the cable.

Heretofore, it has been the practice to station men at different positions along the cable rack to guide the cable as it is being pulled through the distributing frame. My improved cable guide bracket dispenses with the services of these men.

Referring now to the drawing,

Fig. 1 is a plan view of the cable guide bracket with one form of clamping means secured on the end thereof;

Fig. 2 illustrates the cable guide at horizontal to vertical turns;

Fig. 3 shows the cable guide bracket fastened directly to a super-structure;

Fig. 4 illustrates the cable guide bracket fastened to a super-structure with an additional clamping member;

Fig. 5 is a detailed view of the shank portion of the cable guide bracket secured to a super-structure; and Fig. 6 is a modified form of the cable guide bracket in which the supporting rod is dispensed with and an adjustable means substituted therefor.

Referring now to Fig. 1, a rod or bar 10, having a substantially circular cross-section is bent to form an open hook portion 11 and an integral shank portion 12. The hook portion 10 has mounted thereon in close proximity to each other, a plurality of tubular members 13, these members 13 being free to rotate on the member 11 and are secured in place by means of the pins 14 and 15.

Mounted loosely on the shank 12 are a pair of clamping members 16 and 17, these clamping members being provided with irregular shaped clamping jaws 18 and 19 in order that they may securely grip supports of various shapes, for example, the rod 20 as shown in Figs. 2 and 4 or the flat strip 21 as shown in Fig. 6.

The clamping members 16 and 17 are secured on the ends of the shank member 12 by means of the nuts 22 and 23.

As shown in Figs. 2 and 4 the guide members 10 are secured to the supporting rods 20 which are in turn secured to a suitable support or framework by means of the clamping members 24 and 25.

The guide members, as shown in Fig. 2, are serving to guide the cables 26 and 27 around a corner on a horizontal and vertical run. It is readily apparent from this figure that the cables 26 and 27 will meet with a very small amount of friction as they are being pulled into place due to the rollers 13 on the hook portion 11. The particular shape of the hook member 11 prevents the cable from riding out of the guide.

In Fig. 3 the guide bracket is mounted in such a manner as to guide the cables 28 and 29 on a horizontal overhead run. This is accomplished by removing the clamping members 16 and 17 and inserting the shank portion 12 between the bars 30 and 31, as shown in Fig. 5, and securing it thereto by means of the nuts 22 and 23.

Fig. 6 illustrates an adjustable supporting rod for the guide bracket 10 by means of which the height of the guide bracket may be regulated to give it the proper clearance. This is accomplished by means of a threaded collar 32 and the locking nuts 33 and 34.

Applicant's cable guide bracket provides an indispensable aid in the pulling of telephone cable through distributor frames and cable racks in that the guide may be placed at various convenient points along the line where the cable is to be pulled, thereby not only relieving the men that heretofore were required to guide the cables by hand, but so supporting the cables while they are in motion that the insulation of the cable is not impaired.

What is claimed is:

1. A guiding means for cables and the like comprising a straight shank portion and a hook portion, the end of the hook portion being spaced from and in line with the straight shank portion to provide an opening for the insertion of cable, said hook portion having ring members loosely mounted thereon, pins projecting from the hook portion at its extremities to hold said ring members thereon, a support, and means on said shank portion for clamping said guiding means thereto.

2. A guiding means for cables and the like comprising a straight threaded shank portion and a hook portion, the end of the hook portion being spaced from and in line with the straight shank portion to provide an opening for the insertion of cable, said hook portion having ring members loosely mounted thereon, pins projecting from the hook portion at its extremities to hold said ring members thereon, a pair of clamping members slidably mounted on said shank portion, and nuts threaded on to said shank portion, one on each side of said clamping members for forcing said clamping members against a support.

HUGH B. BUXTON.